(12) United States Patent
Cataldo

(10) Patent No.: US 6,244,813 B1
(45) Date of Patent: Jun. 12, 2001

(54) MOTORCYCLE TOWING DEVICE

(76) Inventor: Roger W. Cataldo, 6012 NW. 69$^{th}$ Ave., Tamarac, FL (US) 33321

( * ) Notice: Subject to any disclaimer, the term of this patent is extended or adjusted under 35 U.S.C. 154(b) by 0 days.

(21) Appl. No.: 09/678,304

(22) Filed: Oct. 3, 2000

(51) Int. Cl.$^7$ ............................................. B60D 1/167
(52) U.S. Cl. .......................... 414/462; 224/521; 280/402; 414/563
(58) Field of Search ......................... 280/402; 414/462, 414/563; 224/521

(56) References Cited

U.S. PATENT DOCUMENTS

| | | | |
|---|---|---|---|
| 2,726,777 | * 12/1955 | Wiley | 414/563 |
| 3,721,356 | * 3/1973 | McNeill | 414/563 |
| 3,776,572 | 12/1973 | Bane | 280/292 |
| 4,111,449 | 9/1978 | Hancock | 280/402 |
| 5,011,361 | * 4/1991 | Peterson | 414/462 |
| 5,145,308 | 9/1992 | Vaughn et al. | 414/462 |
| 5,366,338 | * 11/1994 | Mortensen | 414/563 |
| 5,560,628 | * 10/1996 | Horn | 280/402 |
| 5,620,197 | 4/1997 | Howes | 280/402 |
| 5,984,613 | * 11/1999 | Motilewa | 414/462 |

FOREIGN PATENT DOCUMENTS

| | | |
|---|---|---|
| 438044 | 11/1967 | (CH) . |
| 2515585 | 5/1983 | (FR) . |

* cited by examiner

*Primary Examiner*—Janice L. Krizek
(74) *Attorney, Agent, or Firm*—Stephen R. Greiner

(57) ABSTRACT

A motorcycle towing device including a platform member with a front end for attachment to the trailer hitch of a land vehicle. An upright member is perpendicularly affixed to the rear end of the platform member. An elevator is selectively raised and lowered upon the upright member by means of a jackscrew positioned atop the platform member. The elevator has a head tube and a pair of pivot bearings positioned at the top and bottom of the head tube. The head tube carries a pivot member. The pivot member has a carriage plate and a pair of pivot arms extending forwardly from the top and bottom thereof for pivotal engagement with the pivot bearings. A pair of wheel engagement arms, for supporting a motorcycle wheel, extend rearwardly from the carriage plate.

11 Claims, 2 Drawing Sheets

MOTORCYCLE TOWING DEVICE

FIELD OF THE INVENTION

The present invention relates generally to land vehicles and, more particularly, to apparatus for single end suspension of a towed vehicle.

BACKGROUND OF THE INVENTION

Hauling motorcycles has never been a particularly easy task. In the past, special trailers were employed which were bulky, heavy, not fuel efficient, and required a costly license to tow. In the alternative, motorcycles were pushed up ramps onto the beds of pickup trucks for transport-a risky undertaking with motorcycle upset being an ever-present danger. Recently, devices capable of lifting one wheel of a motorcycle off the ground for towing behind a land vehicle have been proposed.

The known wheel-raising devices lift the front wheel of a motorcycle off the ground and rely on the motorcycle's pivoting front fork to negotiate turns. These devices have not seen great commercial success since no motorcycle manufacturer recommends towing a motorcycle by its front wheel because such a towing arrangement forces the belt, chain, drive shaft and/or gears of a motorcycle to turn without adequate lubrication. The motorcycle engine must be running in order for the motorcycle's oil pump to lubricate these vital engine components. A need, therefore, exists for a device capable of towing a motorcycle by its rear wheel and able to compensate for the inability to use the front fork of the motorcycle to negotiate turns.

SUMMARY OF THE INVENTION

In light of the problems associated with the known equipment for towing motorcycles behind land vehicles, it is a principal object of the invention to provide a device capable of towing a motorcycle by its heavy rear wheel and pivoting to permit the towed motorcycle to negotiate turns. It is believed that such a device will prolong the useful life of may towed motorcycles.

It is an object of the invention to provide improved elements and arrangements thereof in a motorcycle towing device for the purposes described which is lightweight in construction, inexpensive to manufacture, and dependable in use.

Briefly, the motorcycle towing device in accordance with this invention achieves the intended objects by featuring an adapter portion including for secure fastening to a conventional trailer hitch at the rear of a land vehicle. A base portion is secured to the adapter portion and has a platform member and an upright member affixed perpendicularly to the rear end of the platform member. A lifting portion is carried by the base portion and includes an elevator adapted to slide up-and-down upon the upright member in response to movements of a jackscrew atop the platform portion. The elevator has a head tube with bearings at its top and bottom. A pivot member is carried by the head tube and, by means of pivot arms, turns upon the bearings. A pair of motorcycle tie-down arms extending outwardly and rearwardly from the pivot member and a pair of wheel engagement arms, for supporting a motorcycle wheel, extend rearwardly from the pivot member. A roller is affixed between the wheel engagement arms at a distance from the pivot member for engagement with the bottom of a motorcycle wheel.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
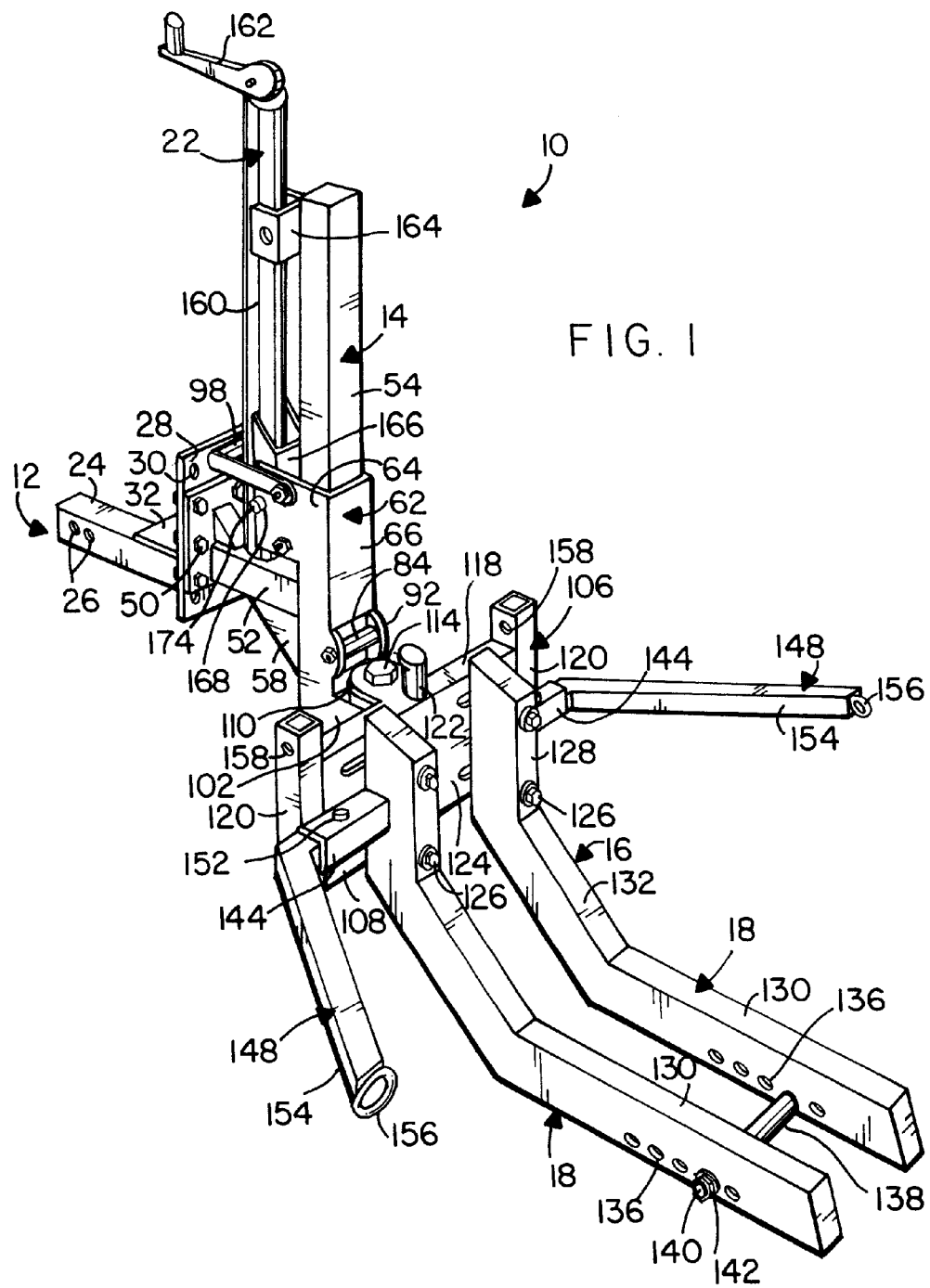
FIG. 1 is a perspective view of a motorcycle towing device in accordance with the present invention.
Figure 2:
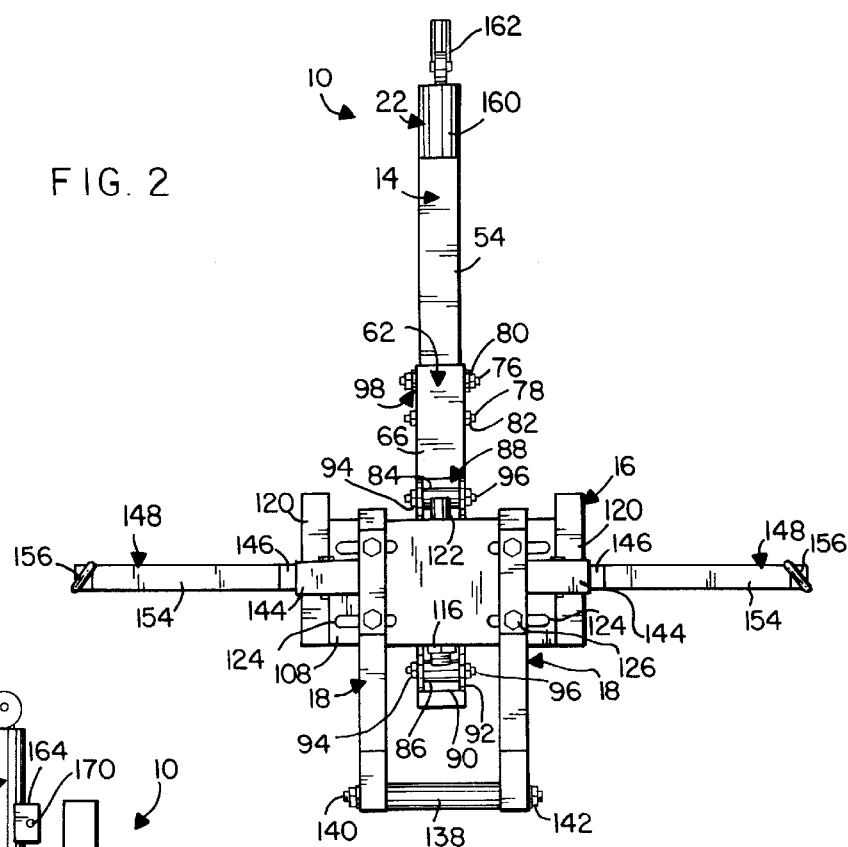
FIG. 2 is a rear view of the motorcycle towing device of FIG. 1.
Figure 3:
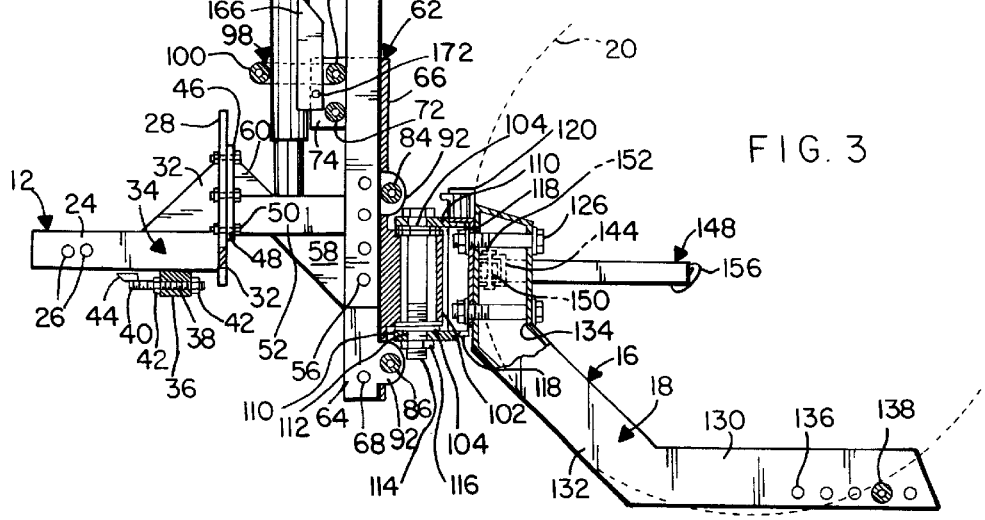
FIG. 3 is a side view of the motorcycle towing device with portions broken away to reveal details thereof.

Referring now to the FIGS., the motorcycle towing device in accordance with the present invention is shown at 10. Towing device 10 includes: an adapter portion 12 for attachment to a trailer hitch positioned at the rear of a land vehicle, a base portion 14 mounted upon adapter portion 12, and a lifting portion 16 carried by base portion 14. Lifting portion 16 has a pair of wheel engagement arms 18 for supporting a motorcycle wheel 20 and jackscrew 22 for selectively elevating arms 18 and wheel 20 so that a land vehicle can be used to tow a motorcycle from place to place.

Adapter portion 12 includes a shaft 24 for snug insertion into the socket of a conventional trailer hitch (not shown). Shaft 24 is square in cross-section to prevent its rotation within the hitch socket having a corresponding cross-section. The front end of shaft 24 is provided with a pair of transverse apertures 26 for selective alignment with a similarly oriented aperture in the trailer hitch. Through the aligned apertures, a pin may be extended to lock adapter portion 12 and the trailer hitch together.

A connector plate 28 is affixed to the rear end of shaft 24. Plate 28 extends from each side, top, and bottom of shaft 24 and is provided with a number of holes 30 arranged in like columns on opposite sides of plate 28 with the holes 30 in each column being evenly spaced from one another. A gusset 32 extending upwardly from the top of shaft 24 reinforces plate 28.

Secured to the bottom of shaft 24 is a towing device anchor 34 for abating any swaying of adapter portion 12 during use. Anchor 34 includes a tubular sleeve 36 affixed to shaft 24 and having a bore 38 whose longitudinal axis is aligned with that of shaft 24. A threaded rod 40 is extended through bore 38 and selectively locked in place by nuts 42 at its front and rear ends that bear upon sleeve 36. A wedge 44 is affixed to the front end of rod 40 which, by means of nuts 42, may be forcibly driven into any gap that may exist between shaft 24 and the trailer hitch to prevent any relative movement thereof.

Base portion 14 has a mounting plate 46 for positioning flush against connector plate 28. As shown, mounting plate 46 is provided with a number of holes 48 arranged side-by-side in columns for selective alignment with holes 30 of connector plate 28. Threaded fasteners 50 extended through holes 30 and 48 selectively secure mounting plate 46 to connector plate 28 in a manner that permits such to be moved out or down, as a user may desire.

Extending rearwardly from mounting plate 46 is a platform member 52 of square cross-section. To the rear end of platform member 52 is affixed an upright member 54 with a plurality of transverse apertures as at 56 positioned along its length. Upright member 54 has a square cross-section and extends above and below platform member 52. A gusset 58 projecting from the bottom of platform member 52 reinforces the lower extension of upright member 54. A gusset 60 extending from the top of platform member 52 reinforces the connection with mounting plate 46.

Lifting portion 16 has an elevator 62 that slides up-and-down upon upright member 54. Preferably, elevator 62 includes a pair of side walls 64, for positioning against the sides of upright member 54, connected together by a rear wall 66 for positioning against the rear of upright member 54. A pair of laterally opposed apertures 68 is provided at the bottom of side walls 64 for selective alignment with apertures 56 in upright member 54 and through which the locking pin (not shown) may be extended to fix the height of elevator 62 on upright member 54.

Elevator 62 is provided with a pair of rollers 70 and 72 at its front to prevent binding on upright member 54. To this end, the tops of side walls 64 are provided with forwardly directed flanges 74 between which rollers 70 and 72 are positioned to bear on upright member 54. The opposite ends of the axles 76 and 78 upon which rollers 70 and 72 turn are journaled in flanges 74 and secured in place by nuts 80 and 82.

A pair of rollers 84 and 86 is mounted to the rear of elevator 62 to limit binding against upright member 54. Here, rear wall 66 is provided with a pair of vertically spaced windows 88 and 90, one in the middle of rear wall 66 in the other at its bottom. Each of the windows 88 and 90 is flanked by a pair of rearwardly directed flanges 92 having rollers 84 and 86 positioned therebetween to press against upright member 54. Journaled in flanges 92 and secured in place by nuts 94 are the opposite ends of axles 96 upon which rollers 84 and 86 turn.

Nuts 80 secure the opposite ends of the U-shaped handle 98 to the ends of axles 76. At its midpoint, handle 98 supports a roller 100 for bearing against the front of jackscrew 22. Thus, handle 98 serves a dual function of maintaining alignment between elevator 62 and jackscrew 22 during use and also permitting the lifting portion 16 to be easily carried separate from the remainder of device 10 after use.

Between windows 88 and 90, a head tube 102 is affixed to rear wall 66 of elevator 62. Head tube 102 has an interior passageway whose longitudinal axis is oriented parallel to rear wall 66. At its open top and bottom ends, head tube 102 supports circular pivot bearings 104.

A pivot member 106 is carried by head tube 102 and is free to turn from side to side on bearings 104. Pivot member 106 includes a rectangular carriage plate 108 having a pair of pivot arms 110 extending forwardly from the top and bottom thereof for engagement with bearings 104. Pivot arms 110 include axially aligned apertures 112 for positioning adjacent the centers of bearings 104. A retaining bolt 114 is extended through apertures 112 and head tube 102 and set in place with nut 116 to lock pivot member 106 to elevator 62.

Carriage plate 108 has a forwardly facing reinforcement flange 118 secured to its periphery. To the opposite sides of flange 118 are affixed a pair of upright socket members 120. To the top of flange 118 is affixed a post 122 with the catch at its upper end to which a motorcycle-retaining lanyard (not shown) may be tied.

Carriage plate 108 has two pairs of slots 124 arranged in parallel columns in its opposite ends. Slots 124 are horizontal in their orientation and are sized to adjustably receive threaded fasteners 126 extending through wheel engagement arms 18. By selectively loosening and tightening threaded fasteners 126, the spacing between arms 18 can be adjusted to snugly accommodate motorcycle wheels 20 of varying widths.

Each of the wheel engagement arms 18 includes an upright segment 128 for positioning against carriage plate 108 and a reclined segment 130 for selective positioning on the ground joined at right angles to one another by an intermediate segment 132. Apertures 134 in upright segment 128 permit the passage of threaded fasteners 126. A number of apertures 136 spaced along the length of each reclined segment 130 allow for adjustable positioning of a wheel roller 138. Apertures 136 are positioned at a distance from carriage plate 108 that is somewhat greater than the radius of wheel 20 so that wheel 20 can be stably cradled between carriage plate 108 and roller 138.

Roller 138 is positioned for rotation on axle 140. The opposite ends of axle 140 extend through a selected pair of apertures 136. Axle 140, and hence roller 138, is secured in place on arms 18 by nuts 142 rotatably fastened to each of its opposite ends.

A reclined socket member 144 is affixed to the upright segment 128 of each of the wheel engagement arms 18 and projects outwardly therefrom. Each socket member 144 has a square socket accessible through its open outer end sized for snug insertion of the inner segment 146 of motorcycle tie-down arm 148. Axially aligned apertures 150 in the top and bottom of each socket member 144 as well as inner segments 146 of arms 148 provide for the passage of removable, arm retaining pins 152. Because reclined socket member 144 is positioned flush with the front of upright segment 128, it serves to reduce wobble in the arm 18 to which it is affixed.

Each arm 148 has an outer segment 154 extending outwardly and rearwardly from inner segment 146. Each arm 148 terminates at an outer end located to one side or the other of the hub of wheel 20. At each outer end is affixed a ring 156 to which a strap or lanyard extending from a motorcycle can be fastened.

When device 10 is not being used for towing purposes, arms 148 may be disengaged from reclined socket members 144 and carried in a storage positioned by upright socket members 120. The storage position is obtained simply by inserting the inner segments 146 of arms 148 into the open tops of the upright socket members 120 with outer segments 154 projecting rearwardly. Extending pins 152 through aligned apertures 158 and 150 in socket members 120 and inner segments 146 selectively retains arms 148 and the storage position.

Raising and lowering of wheel engagement arms 18 is accomplished by means of jackscrew 22 positioned atop platform member 52. Jackscrew 22 has a conventional construction and has an upper sleeve 160 that can be selectively raised or lowered by manual rotation of handle 162. Affixed to the top and bottom of sleeve 160 are lifting brackets 164 and 166 for selective positioning between the front ends of flanges 74 having aligned apertures 168. Each of brackets 164 and 166 is similarly provided with transverse apertures 170 and 172 that can be selectively brought into alignment with apertures 168. By extending a locking pin 174 through apertures 168 and 172, jackscrew 22 can be attached to elevator 62 in its normal lifting mode. Extending pin 174 simultaneously through apertures 168 and 170, on the other hand, locks elevator 62 in a raised nonuse position.

Use of device 10 is straightforward. First, adapter portion 12 is attached to a conventional trailer hitch on a land vehicle. Next, by means of threaded fasteners 50, mounting plate 46 is joined to connector plate 28 at a suitable height. Then, with a pin 174 extending through apertures 168 and 172 as shown in FIG. 1, the rear wheel 20 of a motorcycle is positioned between wheel engagement arms 18 and elevated from the ground by rotation of handle 162 of jackscrew 22. When wheel 20 has been raised to a sufficient height, and aperture 68 has been aligned with one of the apertures 56, a pin (not shown) may be inserted into the aligned apertures to lock wheel 20 in a raised position. With tie-down arms 148 in reclined socket members 144, lanyards may be extended from the motorcycle to rings 156 to secure the motorcycle in an upright position. Other lanyards can be extended to post 122 for similar purposes. The motorcycle may now be towed without risk damage to the drive train of the motorcycle due to lack of lubrication.

When the motorcycle has been towed to a desired place. The wheel 20 is returned to the ground by rotation of handle 162. When the lanyards are removed from post 122 and rings 156, the motorcycle may be taken away. For optimum ground clearance for device 10 while such is not being employed for towing, pin 174 may removed from apertures 168 and 172 and is inserted into apertures 170 and 172 brought into alignment by manually lifting elevator 62. Device 10 may be made ready for convenient reuse simply by lowering elevator 62 and returning pin 174 to its original position.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A motorcycle towing device, comprising:
   a base portion including:
      a platform member having a front end adapted for attachment to the trailer hitch of a land vehicle and a rear end remote from said front end;
      an upright member affixed perpendicularly to said rear end of said platform member; and,
   a lifting portion including:
      an elevator adapted to slide up-and-down upon said upright member, said elevator having a head tube and a pair of pivot bearings being respectively positioned at the top and bottom of said head tube;
      a jackscrew positioned atop said platform member and attached to said elevator for selectively raising and lowering said elevator;
      a pivot member carried by said head tube, said pivot member having a carriage plate and a pair of pivot arms extending forwardly from the top and bottom of the carriage plate for respective pivotal engagement with said pivot bearings; and,
      a pair of wheel engagement arms, for supporting a motorcycle wheel, extending rearwardly from said carriage plate.

2. The motorcycle towing device according to claim 1 further comprising an adapter portion including:
   a shaft having a front end for snug insertion into the socket of a conventional trailer hitch and a rear end remote therefrom, said shaft also having a pair of transverse apertures in said front end for the selective passage of a pin for locking said shaft to the trailer hitch; and,
   a connector plate affixed to the rear end of said shaft to which said front end of said platform member may be selectively attached.

3. The motorcycle towing device according to claim 2 wherein said adapter portion further includes a towing device anchor for abating swaying of said adapter portion, said anchor including:
   a tubular sleeve affixed to said shaft and having a bore with a longitudinal axis parallel with that of said shaft;
   a threaded rod extending through said bore;
   a pair of nuts, one being fastened to each end of said threaded rod for selectively locking said threaded rod upon said tubular sleeve; and,
   a wedge affixed to said threaded rod which, by means of said nuts, may be forcibly driven into any gap that may exist between said shaft and the trailer hitch.

4. The motorcycle towing device according to claim 1 wherein said lifting portion further includes a pair of motorcycle tie-down arms extending outwardly and rearwardly from said carriage plate, said arms terminating at outer ends to each of which is affixed a ring to which a lanyard extending from a towed motorcycle may be tied.

5. A motorcycle towing device, comprising:
   a base portion including:
      a platform member having a front end adapted for attachment to the trailer hitch of a land vehicle and a rear end remote from said front end;
      an upright member affixed perpendicularly to said rear end of said platform member; and,
   a lifting portion including:
      an elevator adapted to slide up-and-down upon said upright member, said elevator having a plurality of rollers bearing upon the front and rear of said upright member to prevent its binding against said upright member; said elevator also having a head tube and a pair of pivot bearings each of which is respectively positioned at the top and bottom of said head tube;
      a jackscrew positioned atop said platform member and attached to said elevator for selectively raising and lowering said elevator;
      a pivot member carried by said head tube, said pivot member having a carriage plate and a pair of pivot arms extending forwardly from the top and bottom of the carriage plate for respective pivotal engagement with said pivot bearings;
      a pair of wheel engagement arms, for supporting a motorcycle wheel, extending rearwardly from said carriage plate; and,
      a roller affixed between said wheel engagement arms at a distance from said carriage plate for engagement with the bottom of a motorcycle wheel.

6. The motorcycle towing device according to claim 5 further comprising an adapter portion including:
   a shaft having a front end for snug insertion into the socket of a conventional trailer hitch and a rear end remote therefrom, said shaft also having a pair of transverse apertures in said front end for the selective passage of a pin for locking said shaft to the trailer hitch; and,
   a connector plate affixed to the rear end of said shaft to which said front end of said platform member may be selectively attached.

7. The motorcycle towing device according to claim 6 wherein said adapter portion further includes a towing device anchor for abating swaying of said adapter portion, said anchor including:

a tubular sleeve affixed to said shaft and having a bore with a longitudinal axis parallel with that of said shaft;

a threaded rod extending through said bore;

a pair of nuts, one being fastened to each end of said threaded rod for selectively locking said threaded rod upon said tubular sleeve; and, a wedge affixed to said threaded rod which, by means of said nuts, may be forcibly driven into any gap that may exist between said shaft and the trailer hitch.

8. The motorcycle towing device according to claim 5 wherein said lifting portion further includes a pair of motorcycle tie-down arms extending outwardly and rearwardly from inner ends adjacent said carriage plate, said arms terminating at outer ends to each of which is affixed thereto a ring to which a lanyard extending from a towed motorcycle may be tied.

9. The motorcycle towing device according to claim 8 wherein said lifting portion further includes:

a pair of reclined socket members each being affixed to a respective one of said wheel engagement arms for selectively receiving and supporting said inner ends of said motorcycle tie-down arms in an orientation for towing; and, a pair of upright socket members affixed to said carriage plate for selectively receiving and supporting said inner ends of said motorcycle tie-down arms in a storage orientation.

10. The motorcycle towing device according to claim 5 wherein said carriage plate is provided with a plurality of slots and said wheel engagement arms are attached to said carriage plate by threaded fasteners penetrating said slots.

11. A motorcycle towing device, comprising:

an adapter portion including:

a shaft having a front end for snug insertion into the socket of a conventional trailer hitch and a rear end remote therefrom, said shaft also having a pair of transverse apertures in said front end for the selective passage of a pin for locking said shaft to the trailer hitch;

a connector plate affixed to the rear end of said shaft;

a base portion including:

a mounting plate releasably attached to said connector plate;

a platform member having a front end affixed to said mounting plate and a rear end remote from said front end;

an upright member affixed perpendicularly to said rear end of said platform member; and, a lifting portion including:

an elevator adapted to slide upon said upright member, said elevator having a plurality of rollers bearing upon the front and rear of said upright member to prevent binding against said upright member, said elevator also having a head tube and a pair of pivot bearings each of which is respectively positioned at the top and bottom of said head tube;

a jackscrew positioned atop said platform member and attached to said elevator for selectively raising and lowering said elevator;

a pivot member carried by said head tube, said pivot member having a carriage plate and a pair of pivot arms extending forwardly from the top and bottom of said carriage plate for respective pivotal engagement with said pivot bearings;

a pair of motorcycle tie-down arms extending outwardly and rearwardly from inner ends adjacent said carriage plate, said arms terminating at outer ends each of which having a lanyard-receiving ring attached thereto;

a pair of wheel engagement arms, for supporting a motorcycle wheel, extending rearwardly from said carriage plate; and, a roller affixed between said wheel engagement arms at a distance from said carriage plate for engagement with the bottom of a motorcycle wheel.

* * * * *